(12) United States Patent
Kim (10) Patent No.: US 9,734,318 B2
(45) Date of Patent: Aug. 15, 2017

(54) METHOD AND APPARATUS FOR DEVICE UNLOCKING

(71) Applicant: Samsung Electronics Co., Ltd., Gyeonggi-do (KR)

(72) Inventor: Raetae Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 141 days.

(21) Appl. No.: 14/554,140

(22) Filed: Nov. 26, 2014

(65) Prior Publication Data

US 2015/0161374 A1    Jun. 11, 2015

(30) Foreign Application Priority Data

Dec. 5, 2013  (KR) ......................... 10-2013-0150365

(51) Int. Cl.
*H04W 12/06* (2009.01)
*H04W 92/08* (2009.01)
*G06F 21/34* (2013.01)
*G06F 1/16* (2006.01)
*G06F 3/01* (2006.01)
*H04M 1/67* (2006.01)
*H04M 1/725* (2006.01)
*G06F 21/36* (2013.01)
*G06F 21/31* (2013.01)

(52) U.S. Cl.
CPC ............ *G06F 21/34* (2013.01); *G06F 1/1694* (2013.01); *G06F 3/017* (2013.01); *G06F 21/31* (2013.01); *G06F 21/36* (2013.01); *H04M 1/67* (2013.01); *H04M 1/72527* (2013.01); *H04M 1/72538* (2013.01); *G06F 2200/1637* (2013.01); *H04M 2250/12* (2013.01)

(58) Field of Classification Search
CPC .......... G06F 1/163; G06F 3/011; G06F 3/017; G06F 3/0346; G06F 21/35; H04L 67/12; H04W 4/008; H04W 4/026; H04W 4/027; H04W 12/06; H04W 92/08
USPC .................... 726/2, 4, 16, 17, 19, 21, 26–29
See application file for complete search history.

(56) References Cited

U.S. PATENT DOCUMENTS

2007/0188323 A1     8/2007  Sinclair et al.
2007/0259685 A1*   11/2007  Engblom .............. G06F 1/1626
                                                              455/550.1
(Continued)

FOREIGN PATENT DOCUMENTS

EP      2 364 004 A1    9/2011
EP      2 428 869 A1    3/2012
(Continued)

*Primary Examiner* — Joseph P Hirl
*Assistant Examiner* — Kalish Bell
(74) *Attorney, Agent, or Firm* — Cha & Reiter, LLC.

(57) ABSTRACT

A method is provided including: generating, by a first device, a first signal indicating a first pattern of movement of the first device; receiving, by the first device, a second signal indicating a second pattern of movement of a second device that is paired to the first device in accordance with a wireless communication protocol; comparing the first pattern of movement of the first device to the second pattern of movement of the second device; and unlocking the first device based on the first pattern of movement of the first device matching the second pattern of movement of the second device.

20 Claims, 9 Drawing Sheets

(56) References Cited

U.S. PATENT DOCUMENTS

| | | | |
|---|---|---|---|
| 2010/0033422 A1* | 2/2010 | Mucignat | G06F 1/1626 345/156 |
| 2011/0183706 A1 | 7/2011 | Jung et al. | |
| 2012/0064951 A1 | 3/2012 | Agevik et al. | |
| 2013/0015946 A1 | 1/2013 | Lau et al. | |
| 2013/0282815 A1 | 10/2013 | Du | |
| 2014/0325614 A1* | 10/2014 | Rhelimi | H04W 12/06 726/4 |

FOREIGN PATENT DOCUMENTS

| | | | | |
|---|---|---|---|---|
| JP | 2010213152 A * | 9/2010 | | H04W 84/06 |
| WO | 2011/090338 A2 | 7/2011 | | |

* cited by examiner

METHOD AND APPARATUS FOR DEVICE UNLOCKING

CLAIM OF PRIORITY

This application claims the benefit under 35 U.S.C. §119(a) of a Korean patent application filed on Dec. 5, 2013 in the Korean Intellectual Property Office and assigned Serial No. 10-2013-0150365, the entire disclosure of which is hereby incorporated by reference.

TECHNICAL FIELD

The present disclosure relates to electronic devices and more particularly to a method and apparatus for device unlocking.

BACKGROUND

Electronic devices are often locked in order to avoid unintentional and/or unauthorized access. When such electronic devices are locked, they may be unlocked by a user entering a password or another type of predetermined input. However, in some circumstances, it may be inconvenient to enter a password and/or another input every time a given electronic device becomes locked. Accordingly the need exists for new techniques for locking and unlocking electronic devices.

SUMMARY

The present disclosure addresses this need. According to one aspect of the disclosure, a method is provided comprising: generating, by a first device, a first signal indicating a first pattern of movement of the first device; receiving, by the first device, a second signal indicating a second pattern of movement of a second device that is paired to the first device in accordance with a wireless communication protocol; comparing the first pattern of movement of the first device to the second pattern of movement of the second device; and unlocking the first device based on the first pattern of movement of the first device matching the second pattern of movement of the second device.

According to another aspect of the disclosure, an electronic device is provided comprising a control unit configured to: receive a first signal indicating a first pattern of movement of the electronic device; receive, from an external device paired to the electronic device in accordance with a wireless communication protocol, a second signal indicating a second pattern of movement of the external device; compare the first pattern of movement of the electronic device to the second pattern of movement of the external device; and unlock the electronic device based on the first pattern of movement of the electronic device matching the second pattern of movement of the external device.

BRIEF DESCRIPTION OF THE DRAWINGS

The above and other aspects, features, and advantages of certain aspects of the disclosure will be more apparent from the following description taken in conjunction with the accompanying drawings, in which.

DETAILED DESCRIPTION

Hereinafter, various aspects of the disclosure are described in detail with reference to the accompanying drawings. The same reference symbols are used throughout the drawings to refer to the same or like parts. Detailed descriptions of well-known functions and structures incorporated herein may be omitted to avoid obscuring subject matter considered more pertinent. It is to be understood, that the drawings may not be drawn up to scale. Furthermore, it is to be understood that the concepts and techniques described herein can be applied to any suitable type of electronic device, such as a smartphone, tablet PC (Personal Computer), mobile phone, video phone, e-book reader, desktop PC, laptop PC, netbook computer, PDA (Personal Digital Assistant), PMP (Portable Multimedia Player), MP3 player, mobile medical appliance, electronic bracelet, electronic necklace, electronic appcessory, camera, wearable device, electronic clock, wrist watch, home appliance (for example; refrigerator, air conditioner, vacuum cleaner, oven, microwave oven, washing machine, and air cleaner), artificial intelligence robot, TV, DVD (Digital Video Disk) player, audio player, various medical appliances (for example; MRA (Magnetic Resonance Angiography), MRI (Magnetic Resonance Imaging), CT (Computed Tomography), movie camera, and ultrasonic instrument), navigation device, GPS (Global Positioning System) receiver, EDR (Event Data Recorder), FDR (Flight Data Recorder), set-top box, TV box (For example; Samsung HomeSync™, Apple TV™, and Google TV™), electronic dictionary, automobile infotainment device, electronic equipment for ship (for example; navigation equipment for ship and gyro compass), avionics, security equipment, electronic clothing, electronic key, camcorder, game console, HMD (Head-Mounted Display), flat panel display device, electronic picture frame, electronic album, portion of furniture or building/structure including a communication function, electronic board, electronic signature receiving device, projector, and their combinations. It may be understood to those skilled in the art that the electronic device is not limited to the above-listed equipment.

Figure 1:
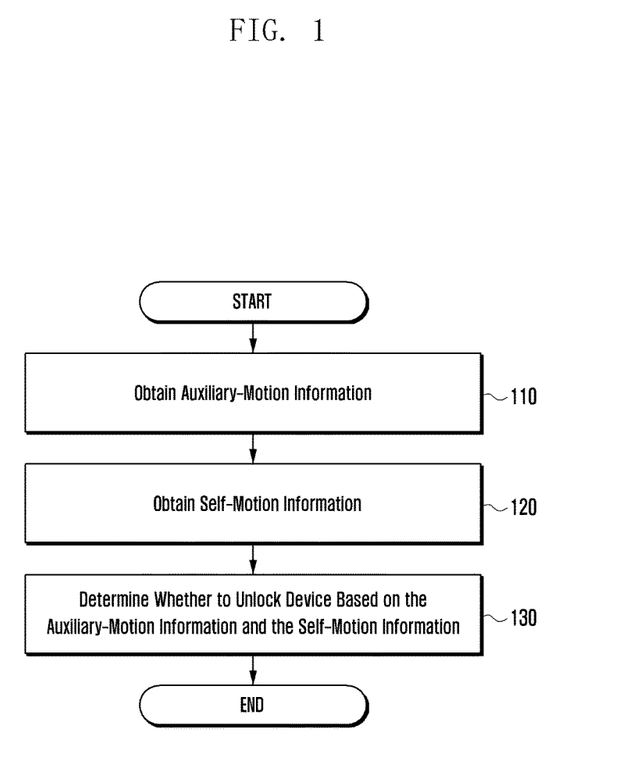
FIG. 1 is a flowchart of an example of a process, according to aspects of the disclosure.

FIG. 1 is a flowchart of an example of a process, according to aspects of the disclosure. At step 110, a device 210 receives auxiliary-motion information from a device 220 that is connected to the device 210 via a wireless connection. In some aspects, the device 210 may be a smart phone and/or any other suitable type of electronic device. The device 220 may include a wearable device, remote controller, earphone, an accessory device, and or any other suitable type of electronic device. The auxiliary-motion information may indicate a pattern of movement of the device 220 and it may be obtained from at least one sensor that is part of the device 220. The sensor may include at least one of an acceleration sensor, gyro sensor, proximity sensor, GPS module, camera, motion sensor, gravity sensor, a dynamic visual sensor, and/or any suitable type of electronic device. By way of example, in some implementations, the device 220 may be one that is paired to the device 210 via any suitable type of communication protocol, such as NFC (Near Field Communication) and Bluetooth.

At step 120, the device 210 obtains self-motion information. The self-motion information may indicate a pattern of movement of the device 210 and it may be obtained from a sensor that is part of the device 210. The sensor may include any suitable type of sensor, such as an acceleration sensor, gyro sensor, proximity sensor, GPS module, camera, motion sensor, gravity sensor, and dynamic visual sensor. The device 210 can detect the self-motion information before receiving the auxiliary-motion information, after receiving the auxiliary-motion information, at the same time of receiving the auxiliary-motion information, and/or in real time.

At step 130, a determination is made whether the device 210 should be unlocked. The determination is made based on at least one of the auxiliary-motion information and the self-motion information. In some instances, the device 210 may unlock itself in response to the auxiliary motion information and the self-motion information matching one another. By way of example, the auxiliary motion information and the self-motion information may match when they are identical or otherwise exhibiting a predetermined level of similarity.

Figure 2:
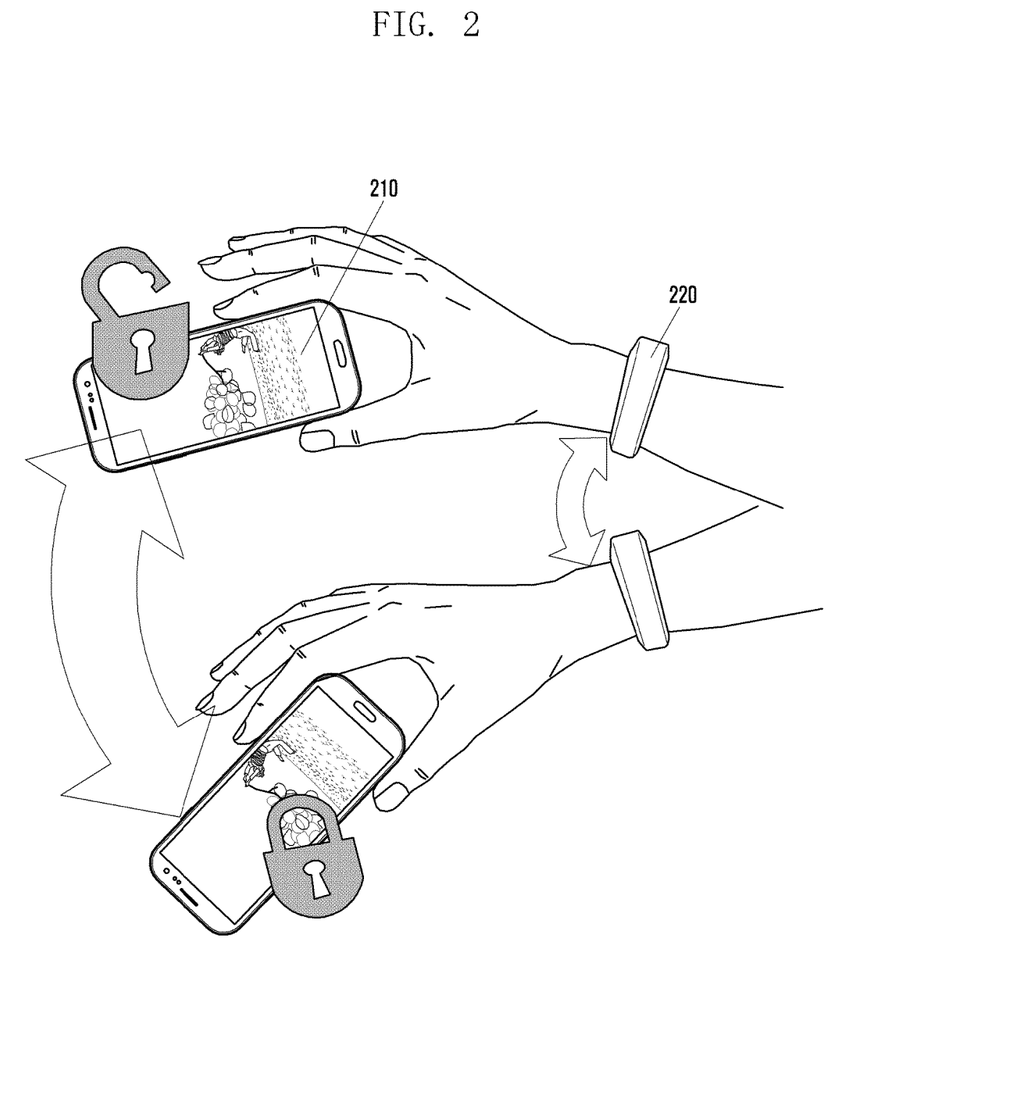
FIG. 2 is a diagram illustrating an example of an implementation of the process of FIG. 1, according to aspects of the disclosure.

FIG. 2 is a diagram illustrating an example of an implementation of the process of FIG. 1, according to aspects of the disclosure. In this example, a user is holding a device 210 (e.g. a smartphone) while also wearing a device 220 (a wearable device) on the user's wrist. The device 210 is initially in a locked state. Then, the user performs a shaking motion, as shown, and the device is unlocked in response. While the shaking motion is being performed, the device 220 detects auxiliary-motion information and transmits the detected auxiliary-motion information to the device 210. The device 220 can detect the auxiliary-motion information in real time, at a predetermined time, or at the time when the pairing with the device 210 is completed. The device 210 receives the auxiliary-motion information and detects self-motion information. While it is in a locked state, the device 210 compares the auxiliary-motion information with the self-motion information and calculates a measure of similarity (e.g., correlation) between the auxiliary-motion information and the self-motion information. If the measure of similarity satisfies a criterion (e.g., exceeds a threshold), the device 210 is unlocked.

In some implementations, the device 210 may calculate a measure of the correlation between the auxiliary-motion information and the self-motion information. Accordingly, if the correlation between the auxiliary-motion information and the self-motion information is within a predetermined range (e.g., above or below a threshold or within predetermined bounds), the device 210 detects that the auxiliary-motion information and the self-motion information match. In some implementations, the predetermined range can be selected according to at least one of a distance between the device 210 and the device 220, the strength of a signal received from the device 220 that constitutes auxiliary-motion information, and performance of the device 220.

Figure 3:
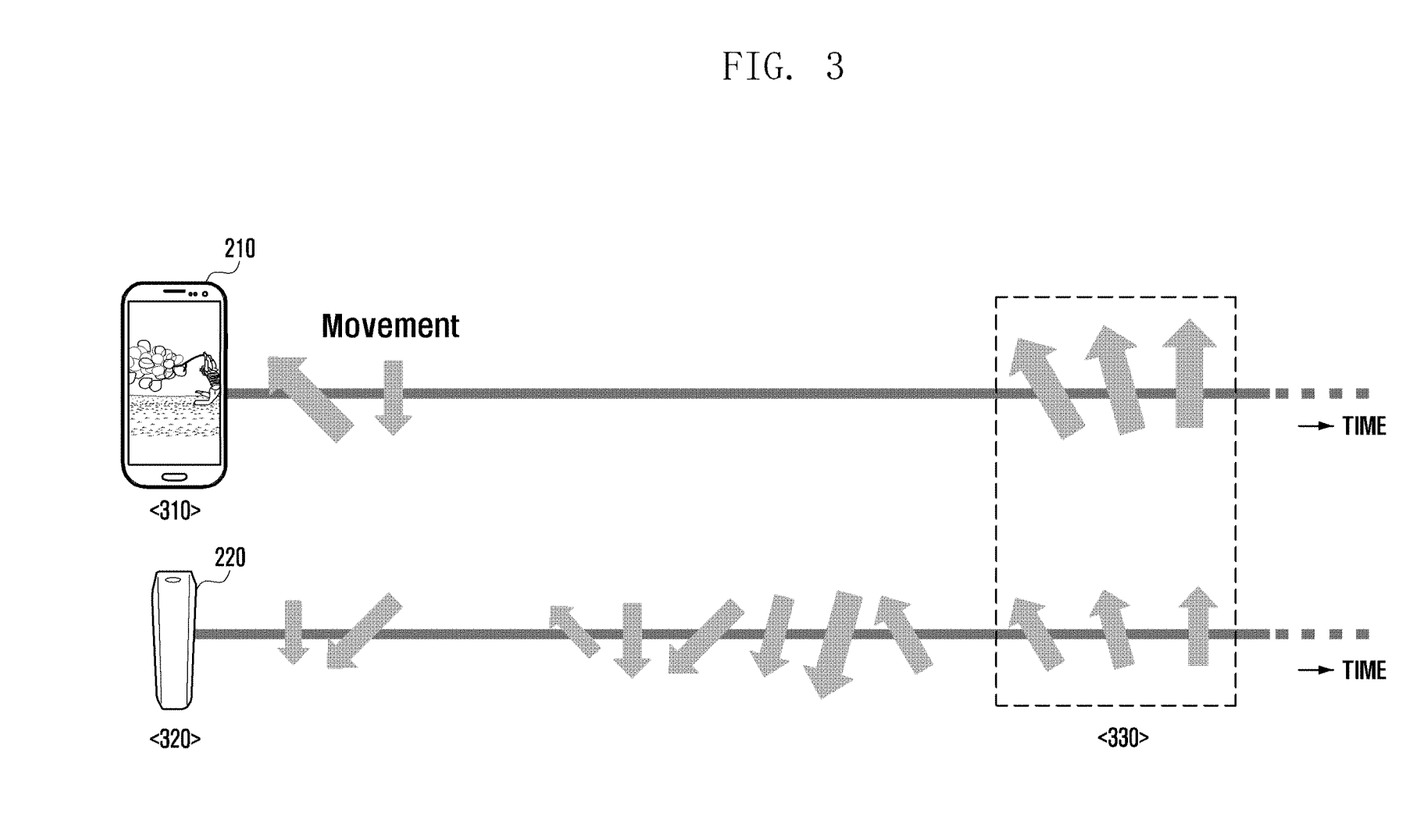
FIG. 3 is a diagram illustrating examples of movement patterns, according to aspects of the disclosure.

FIG. 3 is a diagram illustrating an example of a movement pattern 310 indicated by the self-motion information and a movement pattern 320 indicated by the auxiliary-motion information. In this example, the movement pattern 310 includes a set of measurements of a direction of movement of the device 210 at different time instants. The movement pattern 320 similarly may include a set of measurements of direction of movement of the device 220 at different time instants. As illustrated, the movement pattern 310 and 320 may be compared over a predetermined time period 330 for the purposes of unlocking the device 210. The period 330 may have any suitable length, such as 0.5 sec, 1 sec, 5 sec, etc. Although in this example, each of the input patterns includes measurements of direction of movement of the pattern's respective device at different time instants, it is to be noted that each of the movement patterns may include indication(s) of any suitable characteristic of movement, such as acceleration, angular acceleration, angular speed, trajectory of movement, orientation (e.g., relative to the Earth's magnetic field), speed, etc.

Figure 4:
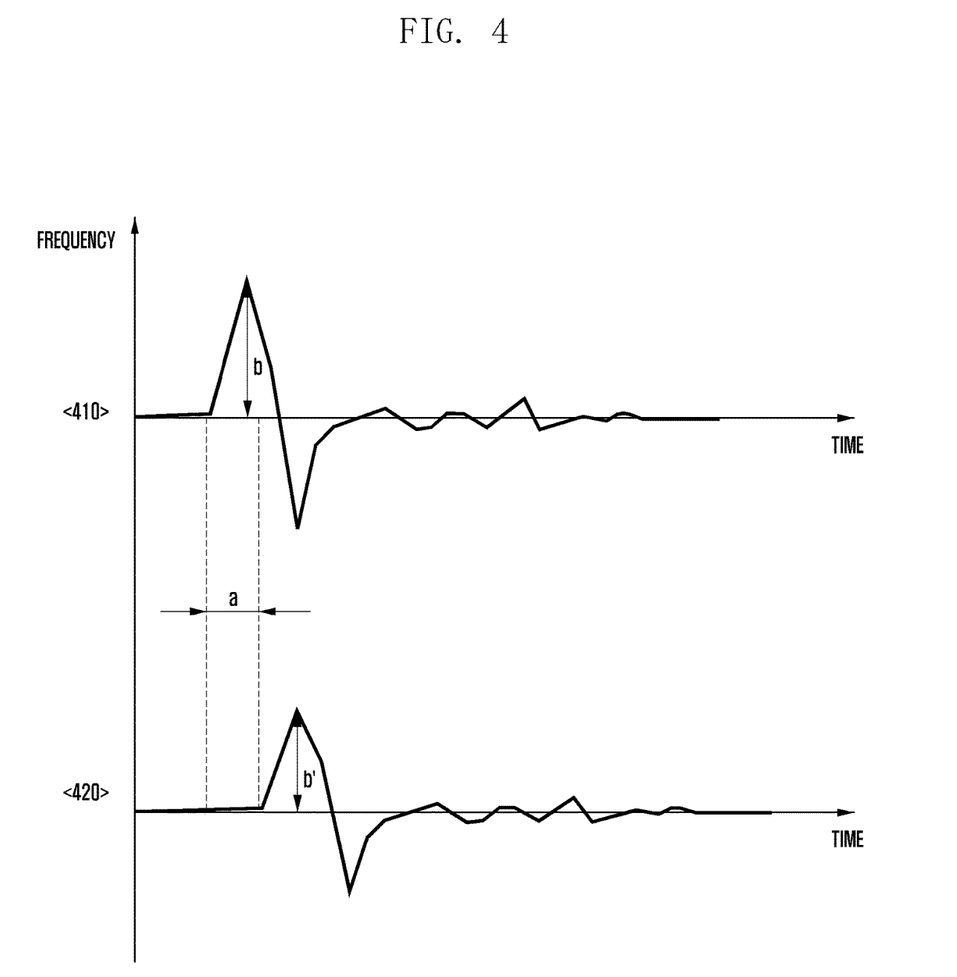
FIG. 4 is a plot of an example of signals that indicate the movement patterns of FIG. 3.

FIG. 4 is an example of a plot of a signal 410 constituting the self-motion information and a signal 420 constituting the auxiliary-motion information. In some implementations, the signals 410 and 420 may be obtained by the device 210 in a pulse-wave form. In one aspect, the intensity and shape of the signals' waves may differ. For example, intensity (b') of the signal information 420 can be lower than the intensity (b) of the signal 410. In another aspect, the signals 410 and 420 may be misaligned, as shown. Accordingly, in order to effectively compare the signals 410 and 420, when determining whether to unlock the device 210, the device 210 may align the signals 410 and 420 first. In some implementations, aligning the signals may include delaying the signal by a predetermined time (a). The magnitude of the delay may be determined based on at least one of the distance between the device 210 and the device 220, signal intensity of the device 220, and performance of the device 220. The first device can decide the unlocking based on the compensated auxiliary-motion information and the self-motion information.

Figure 5:
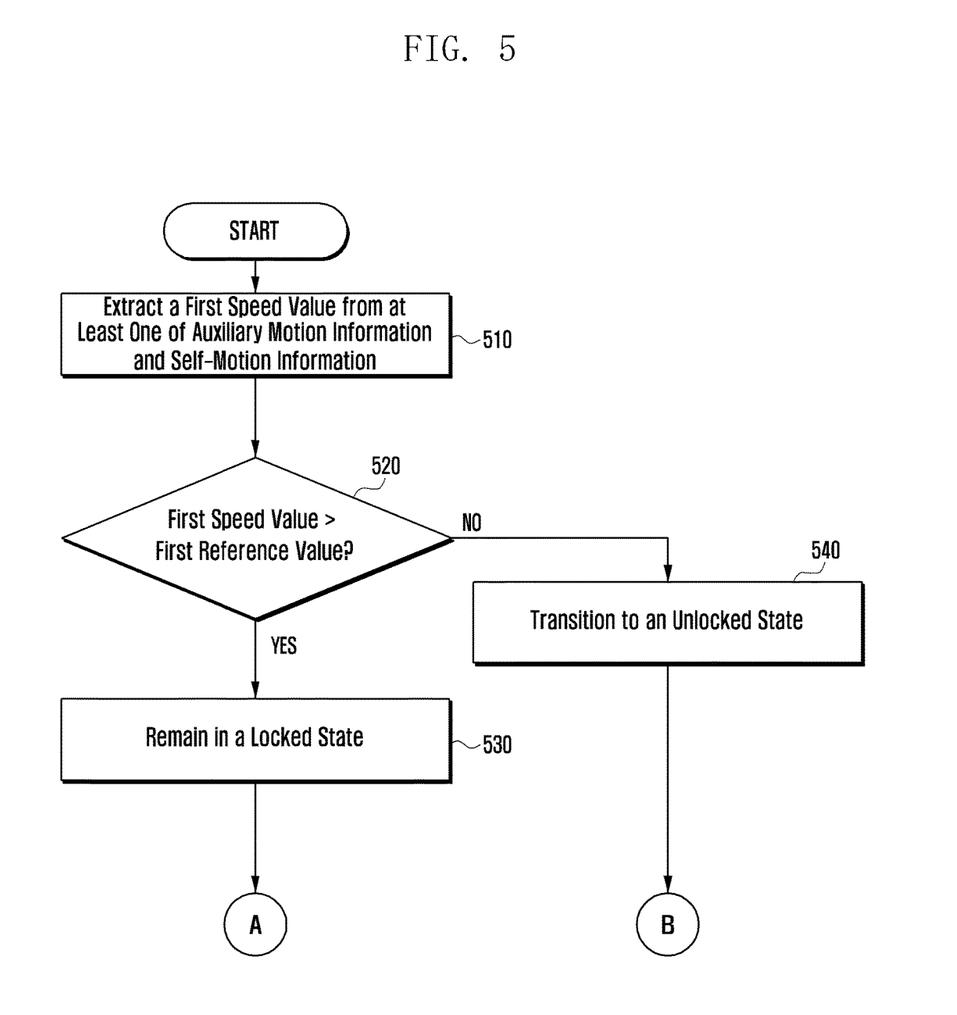
FIG. 5 is a flowchart of an example of a process, according to aspects of the disclosure.

FIG. 5 is a flowchart of an example of a process, according to aspects the disclosure. In some implementations, this process may be performed after a determination is made that the device's 210 self-motion information matches auxiliary motion information received from the device 220. At step 510, the device 210 extracts a first speed value from one of the auxiliary-motion information and the self-motion information. As noted above, the auxiliary motion information may be received at the device 210 from the device 220 and the self-motion information may be generated by the device 210. In some implementations, the device 210 may extract the speed values in order to avoid unlocking due to movements of walking or running which are not intended by the user for unlocking. At step 520, the device 210 identifies whether the first speed value exceeds a first reference value. The first reference value may correspond to a speed that is normally reached by a user when the user is walking or running. At step 530, if the first speed value is greater than the first reference value, the device 210 remains in a locked state. At step 540, if the extracted speed value doesn't exceed the first reference value, the device 210 unlocks itself.

Figure 6:
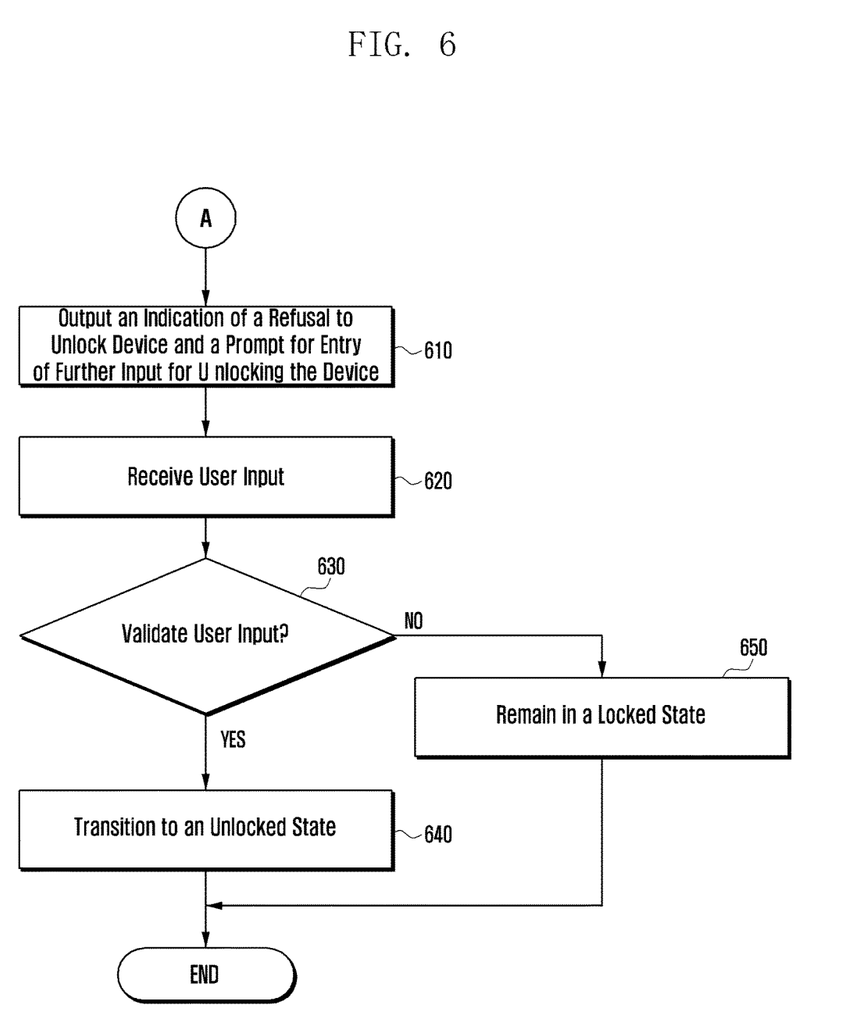
FIG. 6 is a flowchart of an example of a process, according to aspects of the disclosure.

FIG. 6 is a flowchart of a process, in accordance with aspects of the disclosure. At step 610, the device 210 outputs an indication that an unlocking of the device is refused. The indication may include sound, voice, text, and/or any other suitable type of modality. Additionally or alternatively, the device 210 may output a prompt inviting the user to provide further input for unlocking the device 210, in case that the refusal to unlock the device 210 at operation 530 was in error. At step 620, the device 210 receives a user input provided in response to the prompt. At step 630, the device 210 validates whether the received input matches a predetermined input pattern for unlocking the device. At step 640, if the received input matches the predetermined pattern, the device 210 is unlocked. Otherwise, at step 650, if the received input does not match the predetermined patter, the device 210 remains in a locked state.

Figure 7:
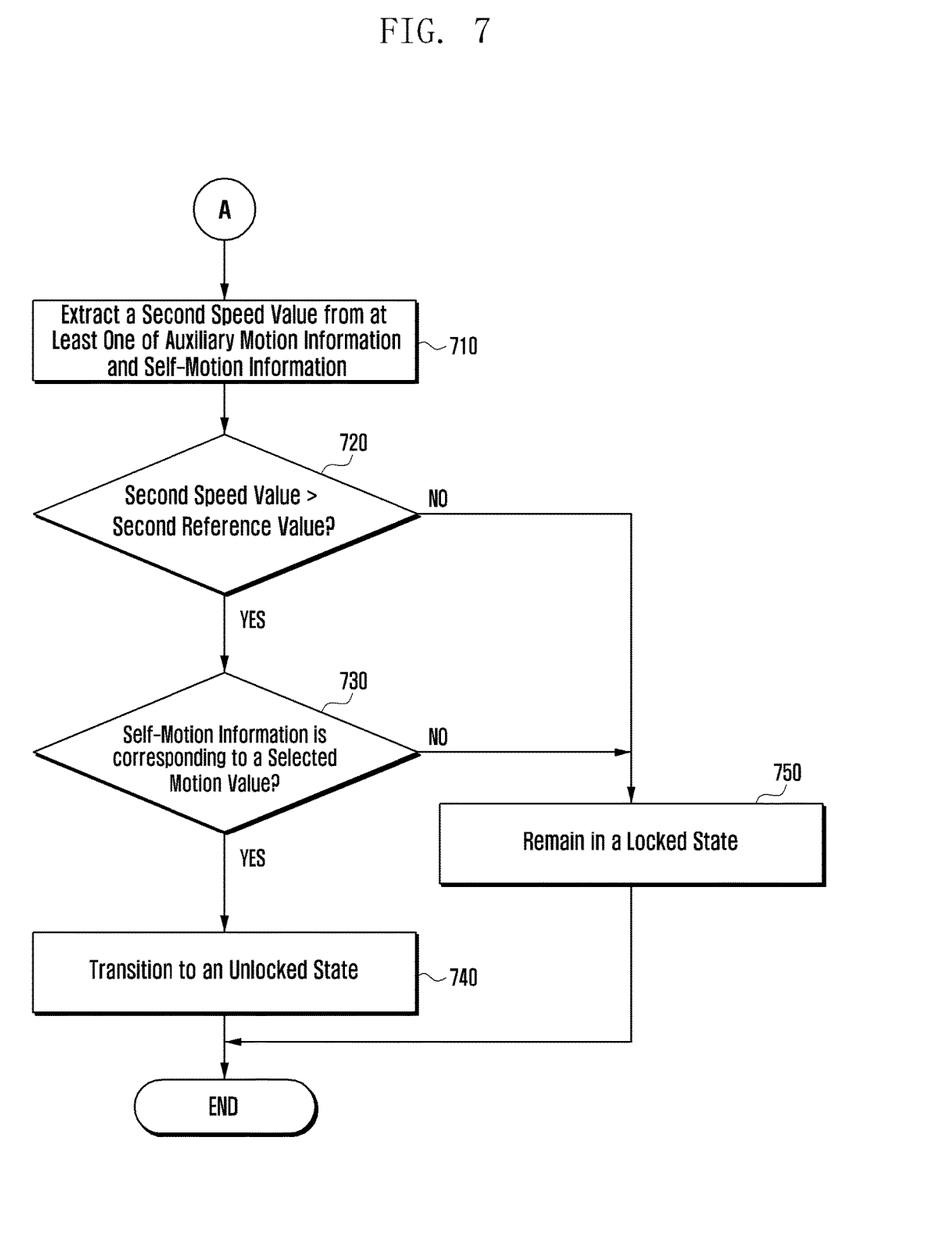
FIG. 7 is a flowchart of an example of a process, according to aspects of the disclosure.

FIG. 7 is a flowchart of an example of a process, in accordance with aspects of the disclosure. At step 710, the device 210 extracts a second speed value from the auxiliary-motion information and the self-motion information. At step 720, the device 210 detects whether the second speed value is less than a second reference value. The second reference value may correspond to a minimum speed value that can be generated when the user is standing (e.g., not walking or running) In some aspects, the comparison of the second speed value to the second reference value may be performed in order to determine whether the user has stopped walking or running.

If the extracted speed value is greater than the second reference value, the device 210 identifies whether the self-motion information is corresponding to a selected motion value at step 730. Namely, the device 210 can identify whether a motion value of raising an arm is generated or the device 210 is moved to a location intended by the user. Accordingly, the motion value can be decided by considering motions of raising an arm and moving to a location intended by the user.

At step 740, the device 210 unlocks itself. At step 750, the device 210 remains in a locked state.

Figure 8:
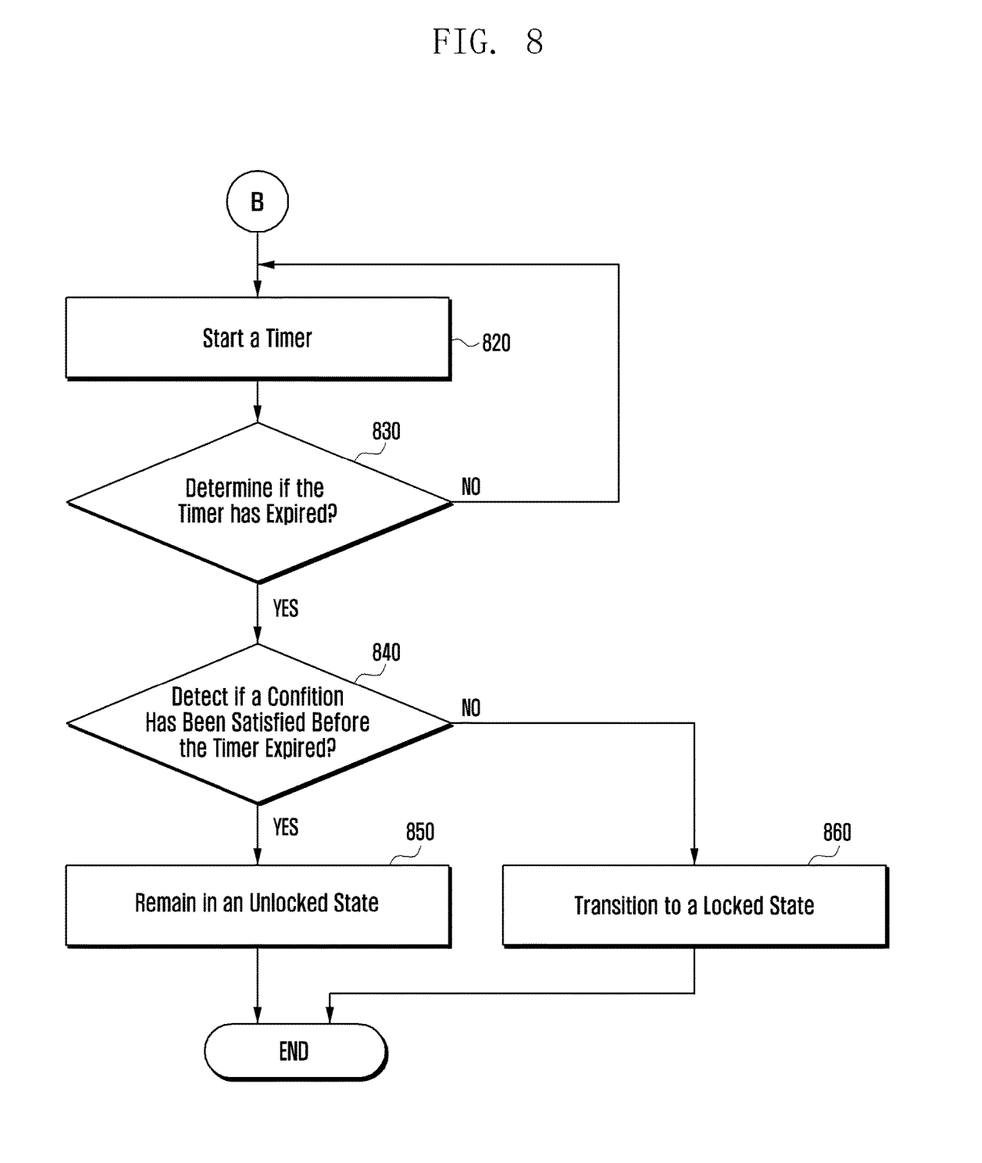
FIG. 8 is a flowchart of an example of a process, according to aspects of the disclosure.

FIG. 8 is a flowchart of an example of a process, in accordance with aspects of the disclosure. At step 820, the device 210 starts an autolock timer. At step 830, the device 210 determines whether the autolock timer has expired. At step 840, the device 220 detects whether a selected condition is satisfied prior to the autolock timer expiring. The selected condition may be satisfied when at least one of: (i) an input is received at the device 210, (ii) the distance from the device 210 to the device 220 is within a reference distance, (iii) whether a signal (e.g., auxiliary-motion information) is received from the device 220, and (iv) whether auxiliary-motion information from the device 220 matches the device 210's self-motion information. In some implementations, detecting whether an input is received may include detecting whether a user input is received through an input unit of the device 210 (e.g., a touchscreen). Additionally or alternatively, in some implementations, if the distance to the device 220 is within a reference distance or a signal is received, the device 210 regards it as the user is unintentionally moving and may decide that the possibility of the device 210 is high. At step 850, if the selected condition is satisfied, the device 210 remains in an unlocked state. Otherwise, at step 850, if the selected condition is not satisfied, the device 210 transitions from the unlocked state to a locked state. Thus, FIG. 9 is a block diagram of an example of an electronic device, according to aspects of the disclosure.

Figure 9:
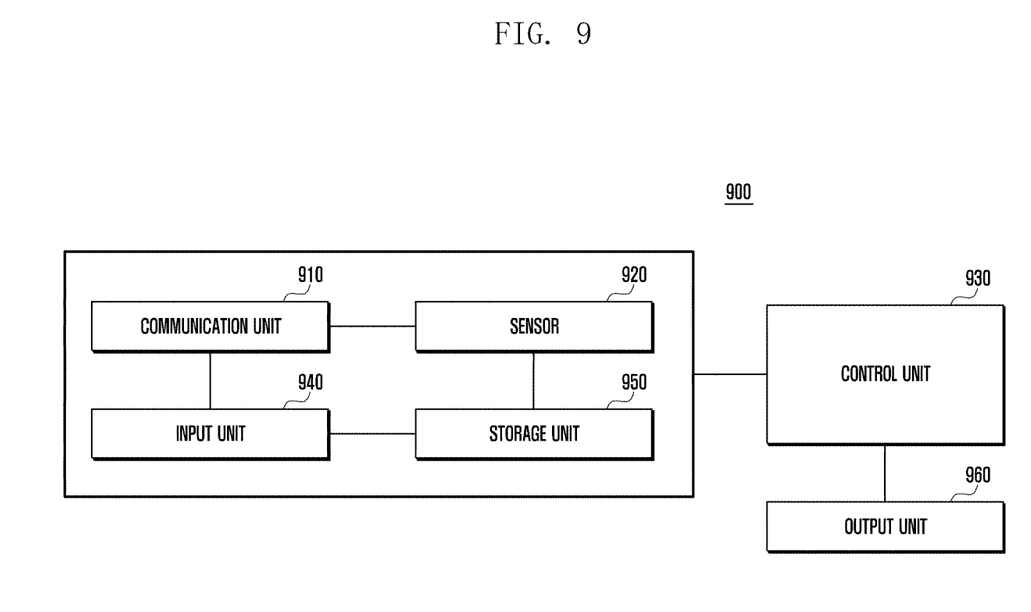
FIG. 9 is a block diagram of an example of an electronic device, according to aspects of the disclosure.

Referring to FIG. 9, the first device 900 may include a communication unit 910, sensor 920, and control unit 930. According to aspects of the disclosure, the first device 900 may further include an input unit 940, storage unit 950, and output unit 960.

The communication unit 910 receives auxiliary-motion information from a paired second device. The communication unit 910 may include a wireless transmitter for up-converting and amplifying the frequency of a signal to be transmitted and a wireless receiver for low-noise amplifying and down converting the frequency of a received signal. Further, the communication unit 910 may include a mobile communication module (for example, 3-Generation mobile communication module, 3.5-Generation mobile communication module, or 4-Generation mobile communication module), digital broadcasting module (for example, DMB module), and local area network module (for example, Wi-Fi) module, Bluetooth module, and NFC module).

The sensor 920 detects self-motion information. The self-motion information may correspond to movement of the first device 900. According to aspects of the disclosure, the sensor 920 can detect the self-motion information by using at least one of an acceleration sensor, gyro sensor, proximity sensor, GPS module, camera, motion sensor, gravity sensor, and dynamic visual sensor. The sensor 920 can detect the auxiliary-motion information before receiving the auxiliary-motion information, after receiving the auxiliary-motion information, at the same time of receiving the auxiliary-motion information, or in real time.

The control unit 930 may include any suitable type of processing circuitry, such as a processor (e.g., an ARM-based processor, an x86-based processor, a MIPS-based processor, etc.) a Field-Programmable Gate Array (FPGA), or an Application-Specific Integrated Circuit (ASIC). The control unit 930 may be configured to perform any of the operations discussed with respect to FIGS. 1-8. In some implementations, in operation, the control unit 930 decides unlocking based on the auxiliary-motion information and the self-motion information. The control unit 930 can unlock the device if the auxiliary-motion information and the self-motion information match.

According to aspects of the disclosure, the control unit 930 compares the auxiliary-motion information and the self-motion information in a predetermined time window (e.g., 0.5 sec, 1 sec, or 3 sec), and identifies whether a measure of similarity is within a predetermined range (e.g., above a threshold, below a threshold, or within predetermined bounds).

According to aspects of the disclosure, control unit 930 can select the range according to at least one of the distance to a second device, signal intensity of the second device, and performance of the second device. The selected reference value may be stored in the storage unit 950. By way of example, because the auxiliary-motion information and the self-motion information are detected by different devices, a measure of correlation between the auxiliary motion information and the self-motion information may be generated. Accordingly, the control unit 930 decides that matching movements are detected by considering a correlation range, if the auxiliary-motion information and the self-motion information match the reference value even though the auxiliary-motion information and the self-motion information are not exactly identical.

According to another aspect of the disclosure, control unit 930 can align the auxiliary-motion information with the self-motion information based on at least one of the distance to a second device, signal intensity of the second device, and performance of the second device, and decide the unlocking based on the compensated auxiliary-motion information and the self-motion information.

According to yet another aspect of the disclosure, the control unit 930 extracts a first speed value from the auxiliary-motion information and the self-motion information, and refrains from unlocking the device 900 if the extracted first speed value exceeds a first reference value. Namely, the control unit 930 doesn't unlock but holds off the locking if the extracted speed value is generated by walking or running Instead, the output unit 960 can output information in at least one of a sound, voice, and text. The control unit 930 can decide whether to unlock the device 900 according to a user input through the input unit 940 corresponding to the information output. Because the unlocking has been held off temporarily, the control unit 930 may control the output unit 960 to output information for identifying whether the user really wants to unlock. The control unit 930 unlocks if the user input is for the unlocking, and remains in a locked state if the user input is not for the unlocking.

According to aspects of the disclosure, the control unit 930 extracts a second speed value from the auxiliary-motion information and the self-motion information. If the extracted second speed value is less than a second reference value, the control unit 930 identifies whether the self-motion information is included in a selected motion value, and unlocks if the self-motion information is included in the selected motion value. Namely, the control unit 930 identifies whether walking or running is stopped, and unlocks by identifying whether a specific movement such as raising an arm is generated.

According to aspects of the disclosure, the control unit 930 counts time according to a predetermined automatic locking after unlocking, identifies whether a selected condition is satisfied when the time count elapsed an automatic locking time, and ignores the automatic locking if the selected condition is satisfied. The control unit 930 can identify whether the condition is satisfied by identifying whether an input is received, whether the distance to the second device is within a reference distance, whether a signal is received from the second device, and whether the auxiliary-motion information and the self-motion information is identical within a reference value.

According to aspects of the disclosure, unlocking can be automatically performed without a specific input, and thereby user convenience is improved.

FIGS. 1-9 are provided as an example only. At least some of the steps discussed with respect to these figures can be performed concurrently, performed in a different order, and/or altogether omitted. It will be understood that the provision of the examples described herein, as well as clauses phrased as "such as," e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Although aspects of the disclosure have been described in detail hereinabove, it should be understood that many variations and modifications of the basic inventive concept described herein will still fall within the spirit and scope of the disclosure as defined in the appended claims.

What is claimed is:

1. A method comprising:
generating, by a first device, a first signal indicating a first pattern of movement of the first device;
receiving, by the first device, a second signal indicating a second pattern of movement of a second device that is paired to the first device in accordance with a wireless communication protocol;
delaying the second signal by a delay interval so that the first signal and the second signal are temporally aligned, wherein length of the delay interval is based on a distance between the first device and the second device and a signal intensity of the second signal;
comparing the first pattern of movement of the first device to the second pattern of movement of the second device; and
unlocking the first device based on the first pattern of movement of the first device matching the second pattern of movement of the second device.

2. The method of claim 1, wherein the first device includes a smartphone and the second device includes a wearable device.

3. The method of claim 1, wherein the first signal is generated by using at least one of an acceleration sensor, gyro sensor, proximity sensor, GPS module, camera, motion sensor, gravity sensor, and dynamic visual sensor.

4. The method of claim 1, wherein the comparing includes identifying a measure of correlation between the first pattern and the second pattern and detecting whether the measure of correlation satisfies a threshold.

5. The method of claim 4, wherein the threshold is based on a strength of the second signal.

6. The method of claim 1, wherein length of the delay interval is further based on a processing speed of the second device.

7. The method of claim 1, further comprising identifying a speed of the first device, wherein the first device is unlocked only when the speed is below a threshold.

8. The method of claim 1, further comprising outputting a prompt for a user to enter further input for unlocking the first device in response to the first pattern and the second pattern not matching.

9. The method of claim 1, further comprising locking the first device unless a condition is satisfied before a timeout period expires, wherein the condition is satisfied when the first device is located within a wireless communication range of the second device.

10. The method of claim 1, further comprising locking the first device unless a condition is satisfied before a timeout period expires, wherein the condition is satisfied when a third pattern of movement of the first device matches a fourth pattern of movement of the second device.

11. An electronic device comprising processor configured to:

receive a first signal indicating a first pattern of movement of the electronic device;

receive, from an external device paired to the electronic device in accordance with a wireless communication protocol, a second signal indicating a second pattern of movement of the external device;

delay the second signal by a delay interval so that the first signal and the second signal are temporally aligned, wherein length of the delay interval is based on a distance between the first device and the second device and a signal intensity of the second signal;

compare the first pattern of movement of the electronic device to the second pattern of movement of the external device; and unlock the electronic device based on the first pattern of movement of the electronic device matching the second pattern of movement of the external device.

12. The electronic device of claim 11, wherein the electronic device includes a smartphone and the external device includes a wearable device.

13. The electronic device of claim 11, wherein the first signal is generated by using at least one of an acceleration sensor, gyro sensor, proximity sensor, GPS module, camera, motion sensor, gravity sensor, and dynamic visual sensor.

14. The electronic device of claim 11, wherein the comparing includes identifying a measure of correlation between the first pattern and the second pattern and detecting whether the measure of correlation satisfies a threshold.

15. The electronic device of claim 14, wherein the threshold is based on a strength of the second signal.

16. The electronic device of claim 14, wherein the length of the delay interval is further based on a processing speed of the second device.

17. The electronic device of claim 11, wherein the processor is further configured to identify a speed of the electronic device, wherein the electronic device is unlocked only when the speed is below a threshold.

18. The electronic device of claim 11, wherein the processor is further configured to output a prompt for a user to enter further input for unlocking the electronic device in response to the first pattern and the second pattern not matching.

19. The electronic device of claim 11, wherein the processor is further configured to lock the electronic device unless a condition is satisfied before a timeout period expires, wherein the condition is satisfied when the electronic device is located within a wireless communication range of the external device.

20. The electronic device of claim 11, wherein the processor control unit is further configured to lock the electronic device unless a condition is satisfied before a timeout period expires, wherein the condition is satisfied when a third pattern of movement of the electronic device matches a fourth pattern of movement of the external device.

* * * * *